UNITED STATES PATENT OFFICE.

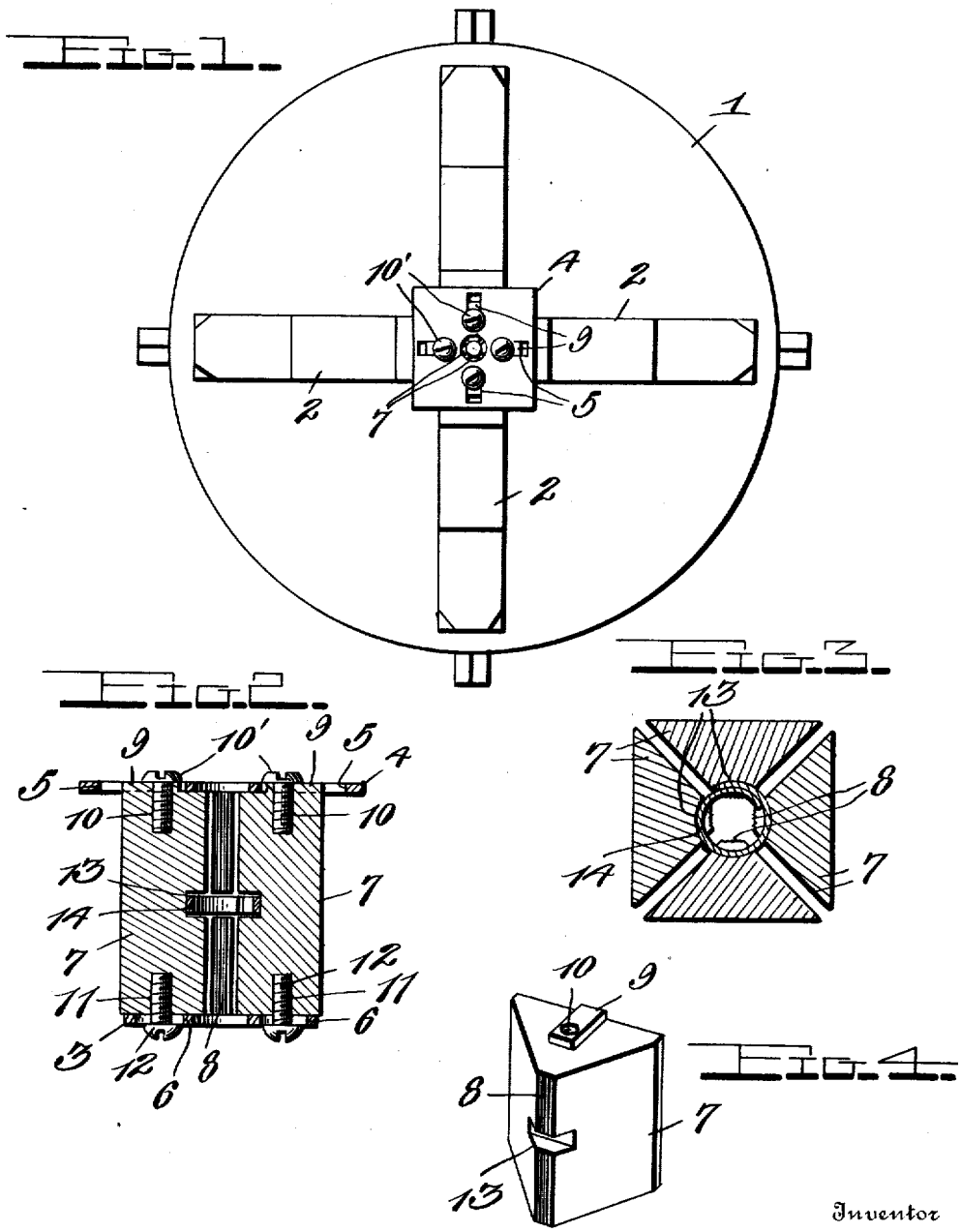

JOSEPH E. GEARHART, OF CLEARFIELD, PENNSYLVANIA.

INSERT-JAWS FOR LATHE-CHUCKS.

1,013,289.  Specification of Letters Patent.  Patented Jan. 2, 1912.

Application filed August 30, 1911. Serial No. 646,820.

*To all whom it may concern:*

Be it known that I, JOSEPH E. GEARHART, a citizen of the United States, residing at Clearfield, in the county of Clearfield and State of Pennsylvania, have invented certain new and useful Improvements in Insert-Jaws for Lathe-Chucks, of which the following is a specification, reference being had to the accompanying drawings.

This invention relates to insert jaws for use in connection with the usual lathe chuck.

It is a well known fact that the radially arranged jaws in the usual lathe chuck have sliding movement for gripping the work of certain dimensions, for instance, some jaws have movement only sufficient to clamp work one-half inch in diameter.

Therefore, the invention has for its object to provide an insert or supplemental jaw whereby work may be operated upon which may be slightly less than one-eighth of an inch in diameter.

With the above and other objects in view, the invention resides in the novel features of construction, combination and arrangement of parts as will be more fully hereinafter described, claimed, and illustrated in the accompanying drawings, in which, Figure 1 is a front elevation of a lathe chuck, the device being shown in place; Fig. 2 is a longitudinal sectional view through the device; Fig. 3 is a transverse sectional view of the same; Fig. 4 is a detail perspective view of one of the supplemental jaws.

Referring to the drawings, the numeral 1 designates a lathe chuck having adjustably mounted thereon radially arranged jaws 2, and between the opposing ends of which the device is to be operated.

The device consists of an inner rectangular plate 3 and an outer rectangular plate 4, the latter plate being slightly greater in diameter than the inner plate 3. The outer plate 4 is provided with a series of spaced slots 5, and the inner plate is provided with similar slots 6. Adapted for sliding movement between the inner and outer plates 3 and 4 are a series of jaws 7, said jaws being substantially triangular in cross section, and are provided with serrated gripping faces 8. The jaws 7 are each provided upon one of their ends with rectangular heads 9, each of which is provided with an internally threaded bore 10. The other ends of the jaws 7 are each provided with a similar bore 11 into which screws 12 are inserted after passing through the slots 6 formed in the inner plate 3. Screws 10' are inserted in the bores 10 to prevent accidental displacement of the outer plate 4. The heads 10 of the jaws are adapted to slide in the slots 5 formed in the outer plate 4, and, by being formed rectangular, undue rocking of the jaws is prevented. Formed in the central portion of the gripping faces 8 are transverse grooves 13. Adapted to seat in the grooves 13 is a band spring 14, the ends of which are arranged in overlapping relation, so that the same may freely contract when pressure is applied to the jaws 7 and expand and force said jaws away from each other when pressure is relieved.

When the device is in place, the opposing ends of the radially arranged jaws of the chuck 1 rest upon the outer faces of the jaws 7, and, upon movement being imparted to the jaws 2, the jaws 7 will be forced inwardly and against the tension of the spring 14 to grip the work. When it is desired to remove the work, the jaws 2 of the chuck are operated and, upon operation, the spring 14 will tend to force the jaws 7 away from each other to permit the ready removal of the work.

Having thus described my invention, what I claim as new and desire to secure by Letters-Patent is:

1. In combination with a chuck provided with a series of radially arranged jaws, an insert consisting of inner and outer plates, supplemental jaws slidably mounted between said plates whereby, when the radially arranged jaws of the chuck are operated, the supplemental jaws will be forced toward each other to grip the work, and means for sliding the supplemental jaws outwardly.

2. In combination with a chuck provided with a series of radially arranged jaws, an insert consisting of inner and outer plates, each of which is provided with a series of alined slots, supplemental jaws slidably mounted in said slots, said jaws having gripping faces, transverse grooves formed in the gripping faces, a band spring seated in said grooves and being adapted to contract when pressure is applied to the supplemental jaws and to expand when the pressure is relieved upon the supplemental jaws whereby said jaws are forced away from each other.

3. In combination with a lathe chuck provided with a series of radially arranged jaws, an insert comprising a pair of plates, said plates being provided with alined slots, supplemental jaws arranged between said plates, one of the ends of the jaws being provided with a rectangular head for engagement with the slots of one of the plates, transverse grooves formed in the gripping face of the supplemental jaws, a band spring seated in said grooves and adapted to contract upon operation of the jaws of the chuck in one direction to clamp the work, said spring being adapted to expand to cause the supplemental jaws to move away from each other when the radially arranged jaws of the chuck are operated in an opposite direction.

In testimony whereof I hereunto affix my signature in the presence of two witnesses.

JOSEPH E. GEARHART.

Witnesses:
GUSSIE CURLEY,
W. I. SWOOPE.

Copies of this patent may be obtained for five cents each, by addressing the "Commissioner of Patents, Washington, D. C."